United States Patent
Naden et al.

(10) Patent No.: US 9,049,156 B2
(45) Date of Patent: Jun. 2, 2015

(54) FRAME STRUCTURE FOR A MULTI-HOP WIRELESS SYSTEM

(71) Applicant: Apple Inc., Cupertino, CA (US)

(72) Inventors: James Naden, Hertfordshire (GB); Gamini Senarath, Nepean (CA); David Steer, Nepean (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/944,424

(22) Filed: Jul. 17, 2013

(65) Prior Publication Data
US 2014/0050126 A1 Feb. 20, 2014

Related U.S. Application Data

(63) Continuation of application No. 12/447,008, filed as application No. PCT/EP2007/061357 on Oct. 23, 2007.

(30) Foreign Application Priority Data

Oct. 26, 2006 (EP) .................................. 06022383

(51) Int. Cl.
| | |
|---|---|
| *H04L 5/00* | (2006.01) |
| *H04L 12/26* | (2006.01) |
| *H04L 12/28* | (2006.01) |
| *H04L 12/741* | (2013.01) |
| *H04B 7/155* | (2006.01) |
| *H04B 7/26* | (2006.01) |
| *H04L 5/14* | (2006.01) |
| *H04L 25/03* | (2006.01) |
| *H04B 7/14* | (2006.01) |
| *H04L 27/26* | (2006.01) |

(52) U.S. Cl.
CPC ................ *H04L 45/74* (2013.01); *H04B 7/155* (2013.01); *H04B 7/2606* (2013.01); *H04L 5/0016* (2013.01); *H04L 5/0039* (2013.01); *H04L 5/0044* (2013.01); *H04L 5/0053* (2013.01); *H04L 5/1469* (2013.01); *H04L 25/03866* (2013.01); *H04L 27/2656* (2013.01); *H04B 7/14* (2013.01)

(58) Field of Classification Search
USPC .......................... 370/315, 382, 330, 343, 344
See application file for complete search history.

(56) References Cited

U.S. PATENT DOCUMENTS

| | | | |
|---|---|---|---|
| 7,095,722 | B1 | 8/2006 | Walke et al. |
| 2005/0201325 | A1 | 9/2005 | Kang et al. |

(Continued)

OTHER PUBLICATIONS

Office Action from Taiwanese Patent Application No. 096138825, issued Apr. 29, 2014, English and Chinese versions, pp. 1-23.

*Primary Examiner* — Dang Ton
*Assistant Examiner* — Robert M Morlan
(74) *Attorney, Agent, or Firm* — Meyertons, Hood, Kivlin, Kowert & Goetzel P.C.

(57) ABSTRACT

A wireless network includes a base station which can serve terminals directly, or via multi-hop transmission paths via relay stations. The base station transmits a downlink sub-frame which includes a first set of frame control information and a second set of frame control information. The second set of frame control information occupies a different position within the downlink sub-frame compared to the first set of frame control information. A relay station is able to transmit a downlink sub-frame to a terminal, or another relay station, while still being able to receive a set of frame control at a different time during the downlink sub-frame. The invention is especially useful in a wireless network in which the downlink transmissions of a base station and a relay station are synchronized to one another and where the downlink transmissions of a base station and relay station occupy the same, or similar, frequency bearer.

20 Claims, 11 Drawing Sheets

(56) References Cited

U.S. PATENT DOCUMENTS

2006/0046643 A1* 3/2006 Izumikawa et al. ............... 455/7
2006/0094435 A1   5/2006 Thomas et al.
2007/0058577 A1* 3/2007 Rubin ........................... 370/328
2007/0072600 A1* 3/2007 Cho et al. ...................... 455/423
2008/0031180 A1* 2/2008 Hsieh et al. .................... 370/315
2008/0084892 A1* 4/2008 Sheen et al. ................... 370/410

* cited by examiner

FRAME STRUCTURE FOR A MULTI-HOP WIRELESS SYSTEM

PRIORITY CLAIM

This application is a continuation of and claims the benefit of priority from U.S. patent application Ser. No. 12/447,008, entitled "Frame Structure for a Multi-Hop Wireless System" and filed on Jan. 15, 2010, which is a National Stage of and claims the benefit of priority from International Application No. PCT/EP2007/061357, entitled "Frame Structure for a Multi-Hop Wireless System" and filed on Oct. 23, 2007, which claims the benefit of priority from European Patent Application Serial No. 06022383.1, filed on Oct. 26, 2006, all of which are fully incorporated herein by reference for all purposes.

BACKGROUND

1. Field of the Application

This invention relates to wireless transmission systems which can support multi-hop transmission paths.

2. Background of the Disclosure

There have been various proposals to create wireless networks to provide Broadband Wireless Access (BWA). These networks can offer an alternative to conventional wired networks which are based on cable or Digital Subscriber Line (DSL) technologies, and can also be used to provide broadband access to areas where wired networks do not exist. Worldwide Interoperability for Microwave Access (WiMAX), set out in IEEE 802.16-2004, specifies a Wireless MAN Air Interface for 'fixed' wireless metropolitan area networks, i.e. networks with static terminals.

A development of IEEE 802.16 is IEEE 802.16e (Mobile WiMAX, now adopted as IEEE 802.16-2005) which provides a common wide area broadband radio access technology for broadband networks which may include static and mobile terminals. The Mobile WiMAX Air Interface uses Orthogonal Frequency Division Multiple Access (OFDMA) for improved multi-path performance in non-line-of-sight environments. An overview can be found in the white paper document "Mobile WiMAX—Part I: A Technical Overview and Performance Evaluation", Feb. 21, 2006, prepared on behalf of the WiMAX Forum and available at http://wimaxforum.org.

It has been realized that situations arise where terminals cannot be adequately served by a direct path to a base station. Therefore, a further development of IEEE 802.16 is to support multiple-hop paths between a base station and a fixed or mobile terminal. This is known as IEEE 802.16j, or Mobile Multi-hop Relay (MMR). FIG. 1 shows an example of a wireless network 10 which uses multi-hop transmission paths. A base station BS serves terminals MS1, MS2, MS3. Terminal MS1 is served directly by the base station BS via a single hop transmission path 2. Terminal MS2 is served by a two-hop transmission path 3, 4 via a relay station RS1. Terminal MS3 is served by a three-hop transmission path 5, 6, 7 via relay stations RS2 and RS3. A multi-hop transmission path may be needed when a single hop transmission path does not offer a sufficient quality. This can be due, for example, to a significant physical obstruction in the line-of-sight path between a base station BS and a terminal, such as the hill 8 shown between base station BS and terminal MS2. Relay stations can also be positioned at the edge of the normal coverage area of a base station to extend the coverage area of the base station. Base stations BS are interconnected via wired, or wireless, backhaul links 11 to a core network 12, which interconnects with other networks 14, such as data networks, the Internet or the PSTN.

FIG. 2 shows the structure of an overall time-division duplex (TDD) frame defined by IEEE 802.16e (IEEE 802.16-2005). Base stations within the system alternately transmit to terminals on a downlink and receive from terminals on an uplink. Each frame is divided into a downlink part (DL) and an uplink part (UL). Time is shown along the horizontal axis and frequency is shown along the vertical axis. IEEE 802.16e uses an OFDM modulation scheme, with a set (e.g. 1024) of OFDM sub-carriers. Consequently, the horizontal time axis corresponds to OFDM symbols and the vertical frequency axis corresponds to OFDM sub-carriers. As the system serves multiple terminals, this scheme is a form of Orthogonal Frequency Division Multiple Access (OFDMA). The downlink part begins with a 'preamble set' 31. This comprises a preamble, a Frame Control Head (FCH), a downlink map (DL-MAP) and an uplink map (UL-MAP). The preamble is used for synchronization, and is the first OFDM symbol of the frame, extending across all OFDM sub-channels. The Frame Control Head (FCH) follows the preamble and provides the frame configuration information such as MAP message length and coding scheme and usable sub-channels. The DL-MAP carries control information for the DL section of the frame and carries information which allocates bursts within the DL part of the frame to individual stations. The UL-MAP carries information which allocates bursts within the UL part of the frame to individual stations and therefore defines when terminals can transmit.

There are restrictions on how the existing IEEE 802.16-2005 standard may be adapted to support relay stations. To ensure backwards compatibility with existing terminals, a relay station should appear to a terminal in the same manner as any other base station. This dictates that the relay station must also transmit a preamble set at the beginning of a downlink sub-frame, in the same manner as a base station. FIG. 3 shows a downlink sub-frame transmitted by a base station BS and a downlink sub-frame transmitted by a relay station RS, with both downlink sub-frames having a preamble set at the beginning of the frame. The transmissions of the base station BS and relay station RS must be synchronized. However, the relay station RS also needs to receive the preamble set 31 transmitted by the base station as this carries synchronization information and information about which bursts within the frame are intended for the relay station. The scheme shown in FIG. 3 would require a relay station RS to receive preamble set 31 from the base station at the same time as transmitting a preamble set to terminals MS. This will increase the complexity of equipment at a relay station as it requires a relay station to have receiver equipment which can operate at the same time as the relay station is transmitting data. It also requires a high-level of isolation between the receive path and transmit path which may be difficult, or impossible, to achieve in many relay station installations.

One proposal made under the Wireless World Initiative New Radio (WINNER) project is to separate relay station and base station transmissions in the frequency domain, with each transmission using a separate block of OFDM sub-carriers. However, this can be wasteful of resources and also requires a high-level of isolation between transmit and receive paths which may be difficult to achieve.

SUMMARY

A first aspect of the invention provides a method of transmitting within a wireless network comprising a base station, at least one terminal and at least one relay station, the method comprising transmitting a downlink sub-frame from the base station which comprises:

a first set of frame control information for a terminal; and a second set of frame control information for a relay station, wherein the second set of frame control information occupies a different position within the downlink sub-frame compared to the first set of frame control information.

Providing the second set of frame control information at a different position within the downlink sub-frame has an advantage that a relay station served by the base station does not need to receive frame control information at the same time as it transmits frame control information. A relay station is able to transmit a downlink sub-frame which includes a set of frame control information in the same position as that transmitted from the base station, typically at the start of the downlink sub-frame. This allows the relay station to appear to a terminal in the same manner as a base station. The relay station receives the second set of frame control information from the base station at a separate time during the downlink sub-frame. The invention is especially useful in a wireless network in which the downlink transmissions of a base station and a relay station are synchronized to one another and where the downlink transmissions of a base station and relay station occupy the same frequency bearer, or closely spaced frequency bearers.

A second aspect of the invention provides a method of transmitting within a wireless network, the relay station forming part of a multi-hop path between a base station and a terminal, the method comprising:

transmitting a downlink sub-frame from the base station which comprises a first set of frame control information;

determining if the base station needs to serve a relay station which is part of a multi-hop path between the base station and a terminal having an even number of hops; and, transmitting, based on the determination, a second set of frame control information within the downlink sub-frame, wherein the second set of frame control information occupies a different position within the downlink sub-frame compared to the first set of frame control information.

Preferably, the method further comprises determining if the base station needs to directly serve a terminal or to serve a relay station which is part of a multi-hop path between the base station and a terminal having an odd number of hops and transmitting the first set of frame control information based on the determination.

It has been realized that there are situations in which it is not always necessary for the base station to transmit both the first and second sets of frame control information and in these situations the base station can adapt the content of the downlink sub-frame. In the case where the network does not have any relay stations which form part of a multi-hop path having an even number of hops, the base station does not need to transmit the second set of frame control information. In the case where all of the terminals in the network are served via relay stations which form part of a multi-hop path having an even number of hops, the base station does not need to transmit the first set of frame control information. The base station can either reallocate the space within the downlink sub-frame which would have been occupied by the first set of frame control information to other downlink traffic, or it can simply not transmit within that part of the downlink sub-frame, which has an advantage in reducing interference within the network.

A further aspect of the invention provides a method of operating a relay station within a wireless network comprising a base station, the relay station and a terminal, the method comprising:

transmitting a downlink sub-frame from the relay station which comprises a first set of frame control information; and receiving a second set of frame control information at a time within the downlink sub-frame which is distinct from the time of the first set of frame control information.

A further aspect of the invention provides a method of operating a relay station within a wireless network comprising a base station, a plurality of relay stations and a terminal, the method comprising:

transmitting a downlink sub-frame from the relay station as part of a multi-hop path between the base station and the terminal; and, selectively including within the downlink sub-frame one of: [0024] a first set of frame control information; and, [0025] a second set of frame control information; wherein the first and second sets of frame control information occupy different positions within the downlink sub-frame and wherein the selection is made according to the position of the relay station within the multi-hop path.

In this manner multi-hop paths of three or more hops can be realized while only requiring two positions within the downlink sub-frame to be reserved for frame control information. Generally, the position of frame control information within a downlink sub-frame will alternate between first and second positions.

In each of the above aspects, it is preferable that the second set of frame control information has a format which is modified compared to the format of the first set of frame control information. This helps to prevent a terminal from synchronizing with respect to the wrong set of frame control information. This modified format of the second set of frame control information can comprise encoding using a different pseudo noise (PN) code or encoding with an offset in the PN code. The modified format can comprise dividing the second set of frame control information into a plurality of segments which are distributed within the downlink sub-frame. The set of segments can additionally be coded with a different PN code, or an offset in the PN code.

The terminal can be a mobile wireless station or a fixed wireless station. The relay station can be a dedicated relay station or a terminal which includes functionality to act as a relay station.

The invention can be applied to a system in which transmission is time division duplexed (i.e. a downlink sub-frame and an uplink sub-frame share the same frequency bearer on a time divided basis), such as the TDD variant of IEEE 802.16. The invention can also be applied to a frequency division duplexed (FDD) scheme in which a downlink sub-frame and uplink sub-frame are transmitted on different frequency bearers. The downlink and uplink sub-frames can occur at different times on the different frequency bearers, or there can be partial or full overlap between them. In each of the above variants, downlink traffic and uplink traffic to/from multiple terminals can share a common downlink and/or uplink sub-frame on a time multiplexed basis (TDMA). Alternatively, or additionally, a frequency bearer can be realized as a set of frequency sub-channels, such as OFDM sub-channels, and the resources of the downlink and/or uplink sub-frames can be shared between multiple terminals on a frequency and/or time divided basis (e.g. OFDMA). The invention can be applied to High Speed OFDM Packet Access (HSOPA)/Long Term Evolution (LTE) and the Wireless World Initiative New Radio (WINNER) project.

Further aspects of the invention provide a transceiver apparatus for a base station and a transceiver apparatus for a relay station which are arranged to implement the above methods, and any of the preferred features of the methods.

The functionality described here can be implemented in software, hardware or a combination of these. The invention can be implemented by means of hardware comprising several distinct elements, and by means of a suitably programmed computer. Accordingly, another aspect of the invention provides software for implementing any of the aspects of the invention.

The software may be stored on an electronic memory device, hard disk, optical disk or other machine-readable storage medium. The software may be delivered as a computer program product on a machine-readable carrier or it may be downloaded to the base station or relay station via a network connection.

BRIEF DESCRIPTION OF THE DRAWINGS

Embodiments of the invention will be described, by way of example only, with reference to the accompanying drawings in which.

DETAILED DESCRIPTION

Figure 1:
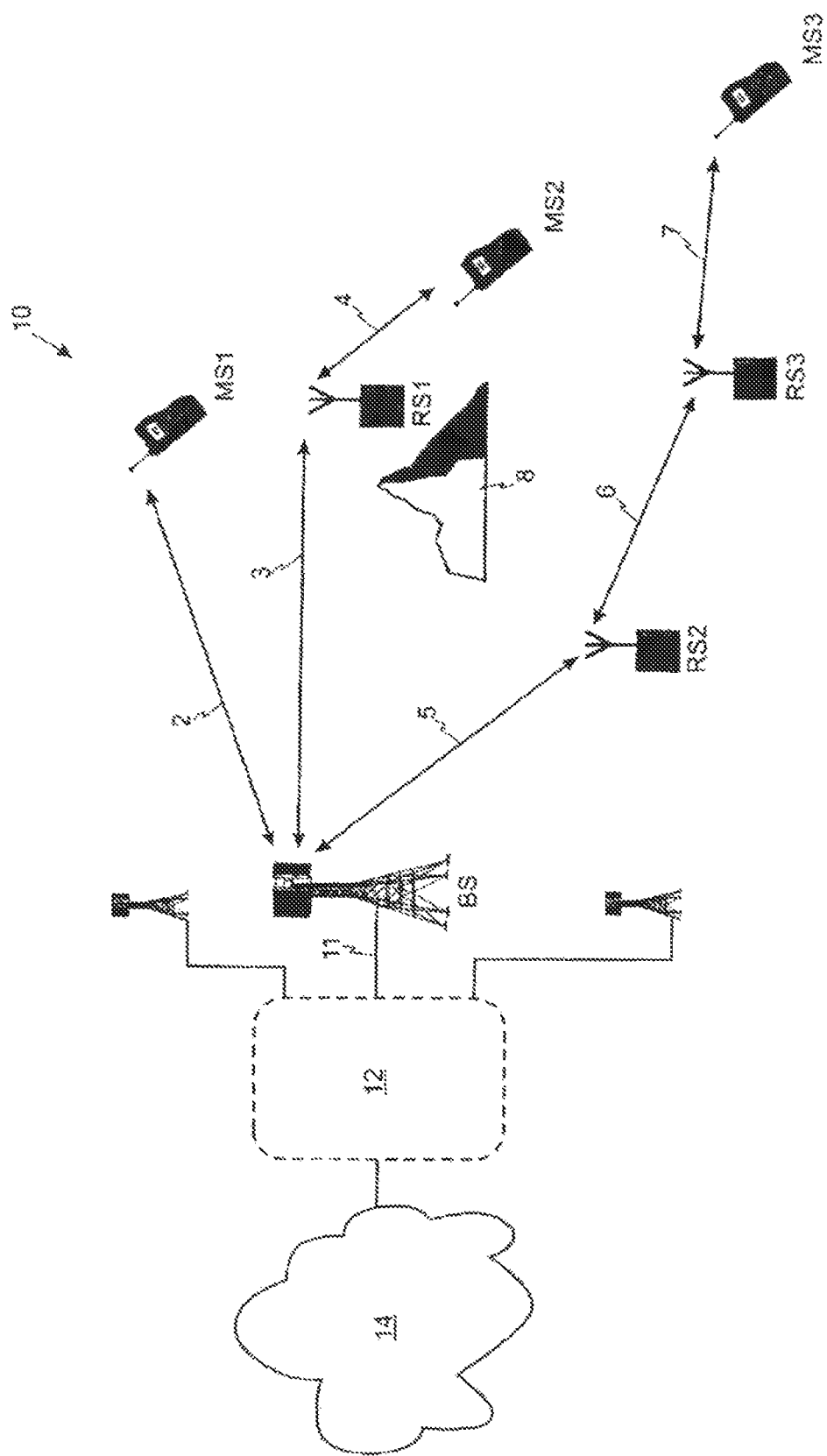
FIG. 1 shows a wireless communications system which supports relay stations.
Figure 4:
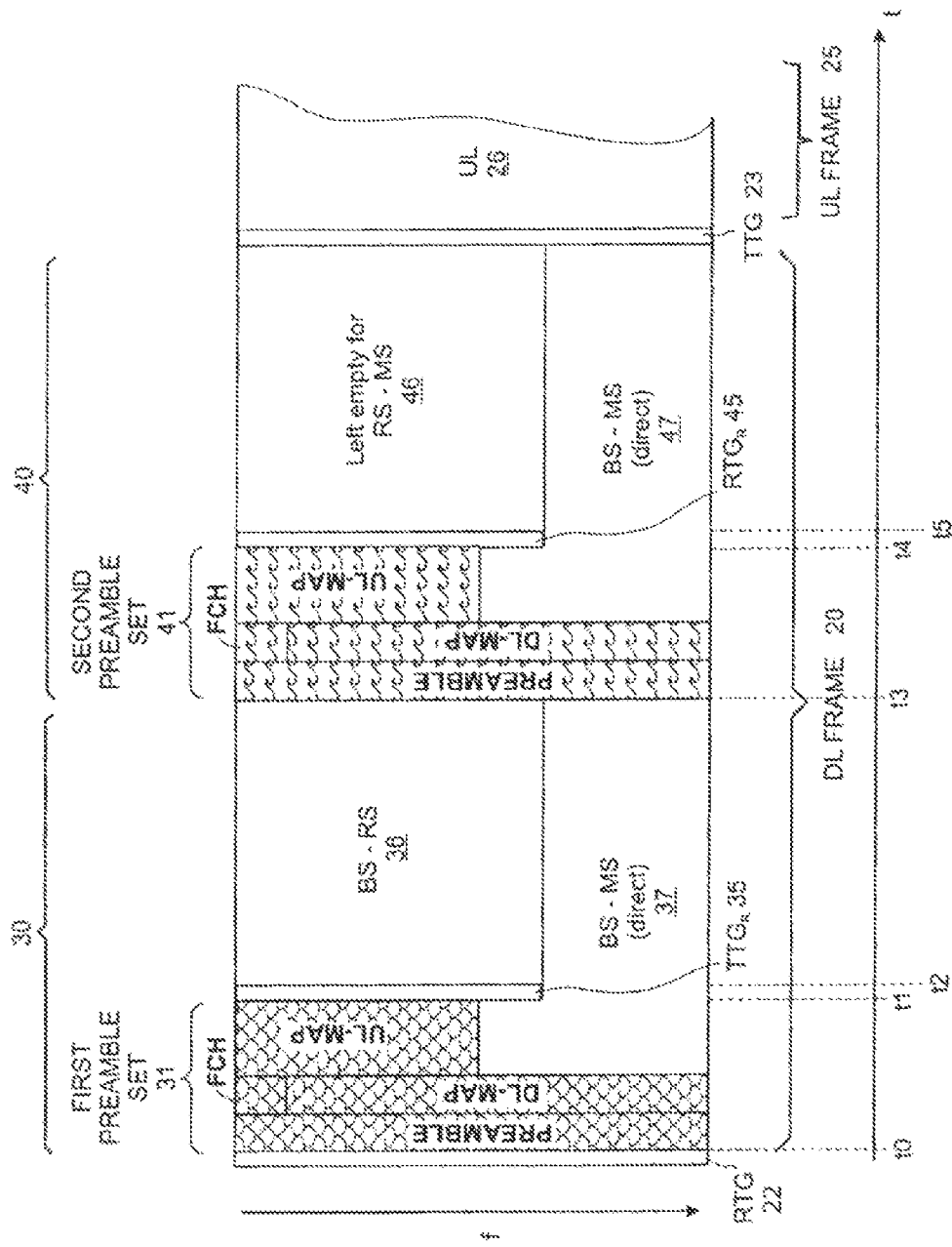
FIG. 4 shows the format of a downlink sub-frame transmitted by a base station according to an embodiment of the present invention.

Embodiments of the invention will be described with reference to a wireless system 10 of the type shown in FIG. 1 in which a base station BS serves a set of terminals MS1-MS3 via direct transmission paths and via multi-hop transmission paths which use relay stations RS1-RS3. FIG. 4 shows a first embodiment of a time-division duplexed transmission frame transmitted by a base station BS which is divided into a downlink sub-frame 20 and an uplink sub-frame 25. As described above, the base station BS, relay stations RS1-RS3 and terminals MS1-MS3 are all synchronized to the time-division duplexed transmission frame.

Figure 2:
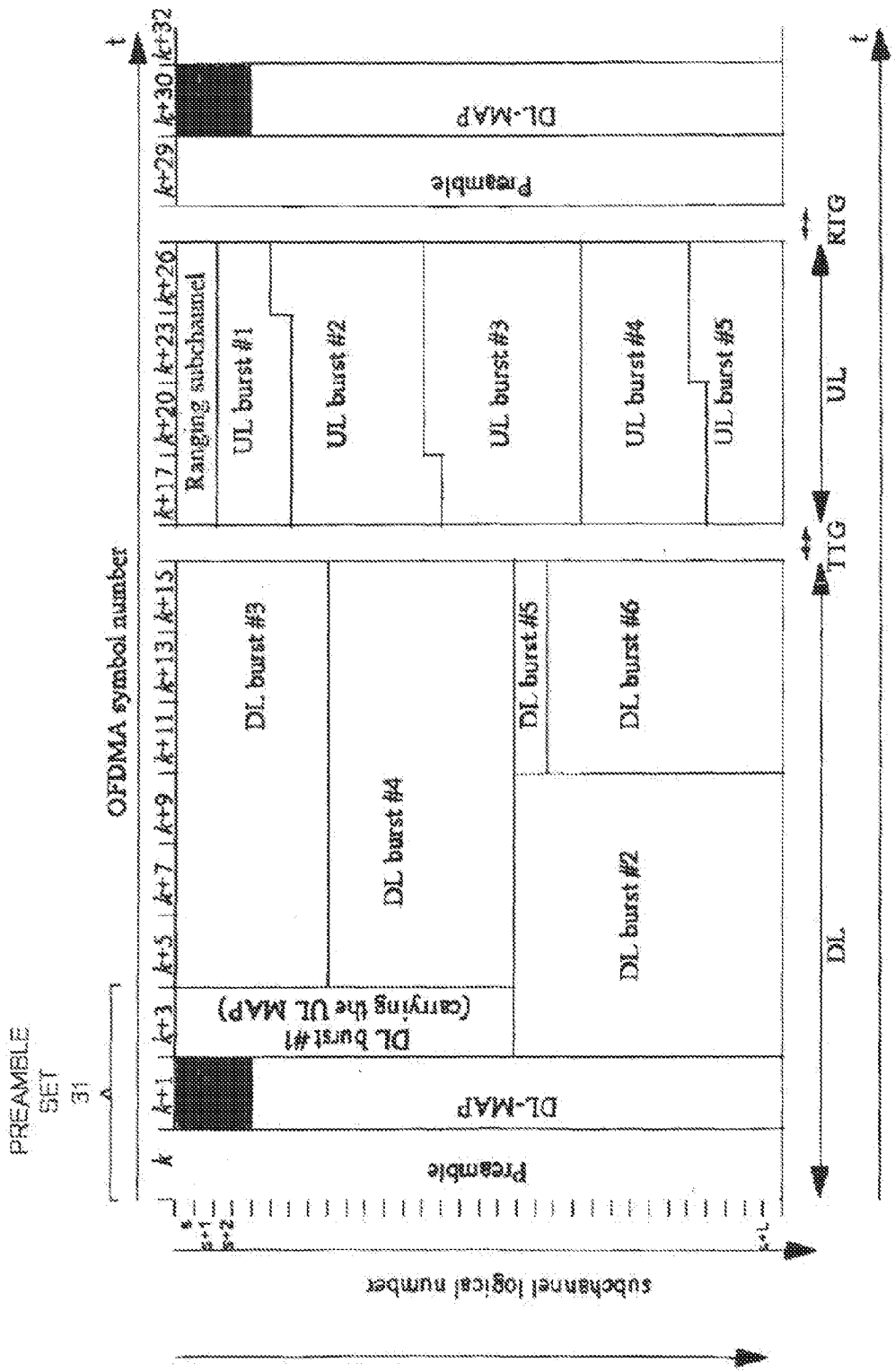
FIG. 2 shows a frame format for wireless transmission defined in IEEE 802.16e (IEEE 802.16-2005)
Figure 3:
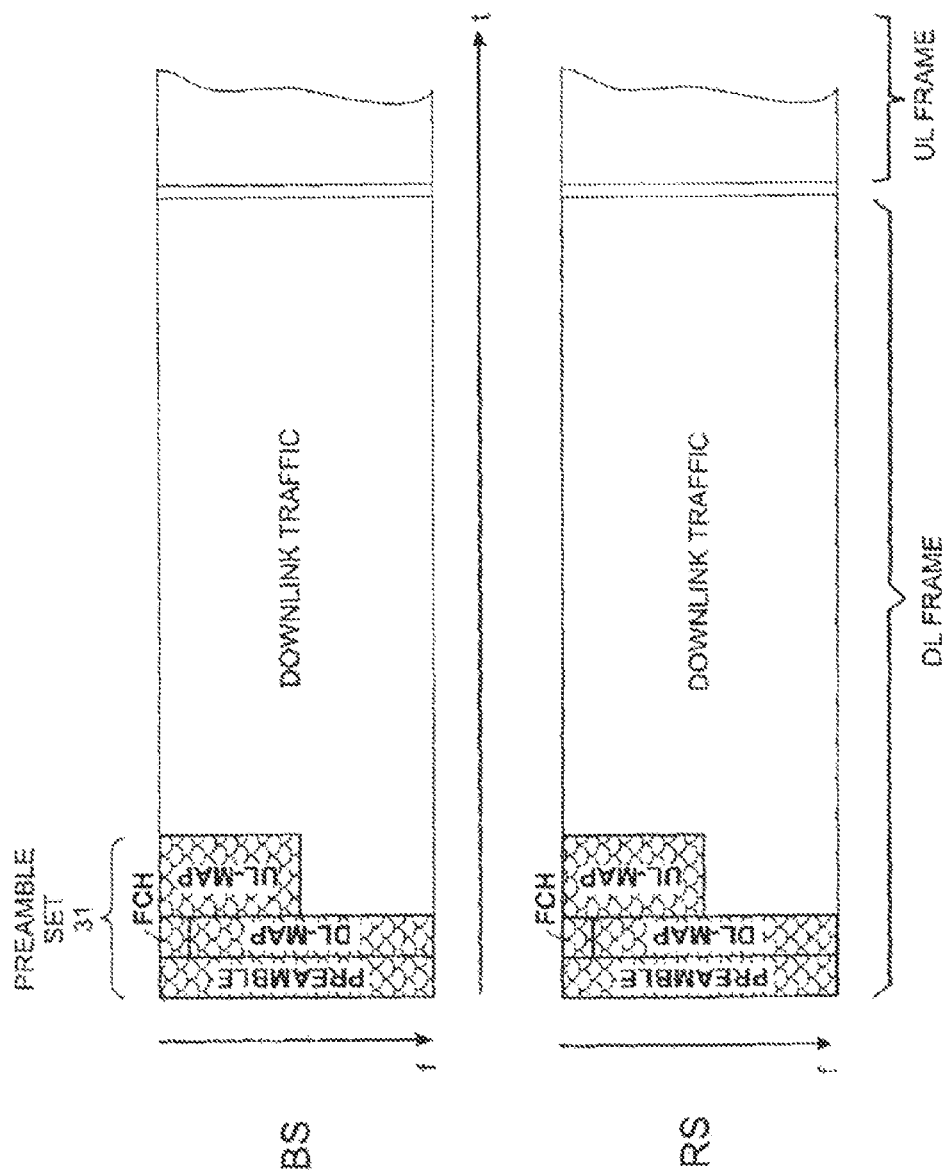
FIG. 3 shows a requirement of downlink transmissions by a base station and a relay station.

In this embodiment the downlink sub-frame 20 transmitted by the base station is divided into two parts 30, 40. The first part 30 begins with a first preamble set 31. This first preamble set 31 carries control information which is intended for end terminals (e.g. mobile stations or fixed wireless terminals). As described previously in connection with FIG. 2, the first preamble set 31 comprises a preamble, a Frame Control Head (FCH), a downlink map (DL-MAP) and an uplink map (UL-MAP). The remainder of part 30 of the downlink sub-frame 20 carries downlink traffic. This is divided into two portions: a first portion 36 is used to carry BS-RS traffic (i.e. traffic which is to be relayed, as in the case of traffic for terminals MS2 and MS3 in FIG. 1) and another portion 37 is used to carry BS-MS traffic (i.e. traffic which is to be delivered directly to a terminal, as in the case of traffic for terminal MS1 in FIG. 1). The second part 40 of the downlink sub-frame 20 begins with a second preamble set 41. In this embodiment, the second preamble set 41 has the same format as the first preamble set and comprises a preamble, a Frame Control Head (FCH), a downlink map (DL-MAP) and an uplink map (UL-MAP). The information contained within the second preamble set 41 is intended for relay stations within the system which are directly served by the base station, such as station RS1 in FIG. 1. The remainder of part 40 of the downlink sub-frame 20 carries further downlink traffic. This is divided into two portions: a first portion 46 is used to carry RS-MS traffic (i.e. traffic which is to be retransmitted by a relay, such as path 4 shown in FIG. 1) and another portion 47 is used to carry BS-MS traffic (i.e. traffic which is to be delivered directly by the base station to a terminal). It can be seen that the traffic transmissions of the BS (sections 36, 37, 47) and RS (section 46) are made orthogonal by placing them in different parts (in terms of time and frequency) of the downlink sub-frame. This helps to avoid any interference between the transmissions of the base station BS and relay stations RS. Although the detail of the uplink is not important to the present invention, terminals and relay stations are individually allocated bursts at which they can transmit data within the uplink frame 25 and similarly this will prevent interference between uplink traffic from relay stations and uplink traffic from terminals.

The downlink sub-frame 20 shown in FIG. 4 will be received by relay stations RS and terminals MS. The downlink map (DL-MAP) carried within the first preamble set instructs a terminal where to find data intended for that terminal within the DL sub-frame. For example, it may instruct the terminal to find data within a particular burst (slot) within sections 37, 47. The downlink map (DL-MAP) carried within the second preamble set is received only by relay stations, and instructs a relay station where to find data within the downlink sub-frame 20. For example, it may instruct relay station RS1 to look in burst #3 within section 36. For the final hop to a terminal MS, the relay station generates data for the first preamble set 31. This causes the relay station to appear as a base station, thereby allowing backwards compatibility with existing terminals.

The downlink sub-frame 20 includes several guard spaces which are to allow radio transceivers within the system sufficient time to switch between transmitting data and receiving data (or vice versa). Receive/Transmit Transition Gap (RTG) 22, at the beginning of the frame, allows the base station to switch between receiving data on the uplink and transmitting data on the downlink. Transmit/Receive Transition Gap (TTG) 23 allows the base station to switch between transmitting data on the downlink and receiving data on the uplink and, similarly, allows any terminals or relay stations to switch between receiving data on the downlink and transmitting data on the uplink. The gaps 22, 23 also prevent collisions between uplink and downlink traffic. RTG 22 and TTG 23 are conventional parts of an IEEE 802.16e TDD frame. Two additional guard spaces are added in the frame shown in FIG. 4. Firstly, $TTG_R$ 35 allows relay stations to switch between transmitting the first preamble set 31 on a downlink to terminals (or other relay station) and receiving data on a downlink from the base station (or other relay stations). Secondly, $RTG_R$ 45 allows relay stations to switch between receiving the second preamble set 41 on a downlink from a base station (or other relay station) and transmitting data on a downlink to terminals, or other relay stations. $TTG_R$ and $RTG_R$ are added for the benefit of the relay station and so do not need to extend over all sub-carriers. Thus, the parts 37, 47 of the frame do not need to include these intervals. Typically, gaps 35, 45 are an integer number of symbols.

Transmission by each relay station RS is preferably restricted to a narrow range of OFDM sub-channels and utilizes the maximum time in order to make optimum use of RS power.

Figure 5:
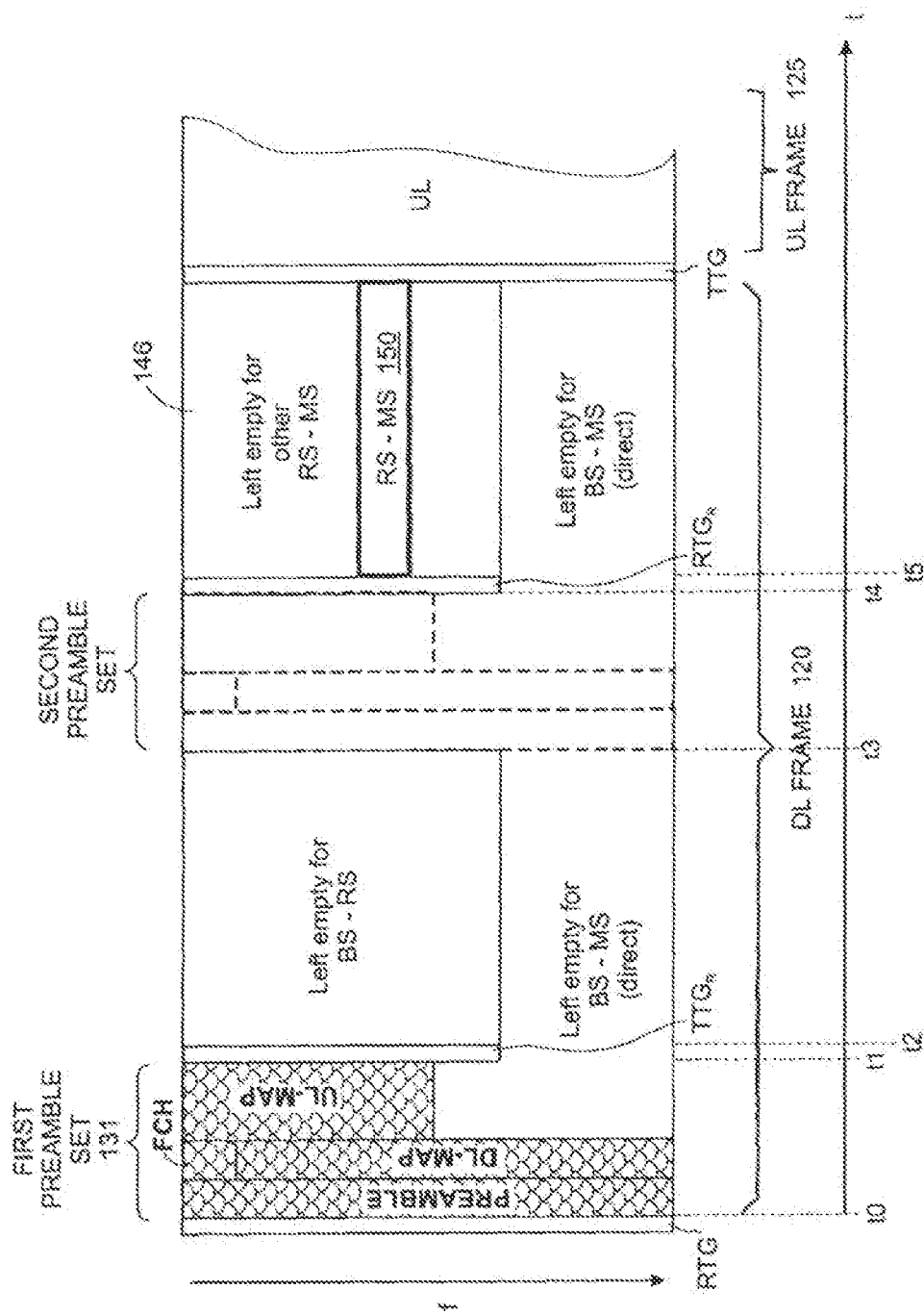
FIG. 5 shows the format of a downlink sub-frame which is transmitted by a relay station serving terminals according to an embodiment of the present invention.

FIG. 5 shows a downlink sub-frame 120 transmitted by a relay station RS towards a terminal MS. A first preamble set 131 is transmitted by the relay station at the beginning of the downlink sub-frame. The first preamble set has the same format as the first preamble set transmitted by the base station (31, FIG. 4) to ensure that it can be correctly received and decoded by an existing (legacy) terminal. The content of the first preamble set may be modified compared to the content of a first preamble set transmitted by a base station. In particular, the DL-MAP part of the first preamble set 131 transmitted by the relay station may only include data specifying the positions of data bursts within the downlink sub-frame for those terminals MS served by that relay station RS. In this example, this relay station transmits data within a burst 150 within section 146 of the frame reserved for RS-MS traffic. As the transmissions of the relay station RS are orthogonal to the transmissions of the base station BS and any other relay stations RS, the downlink frame shown in FIG. 5 does not include any other traffic, apart from the burst 150 which has been reserved for RS-MS traffic.

As noted above, the content of the DL-MAP transmitted by the relay station RS can differ from that transmitted by the base station BS. Generally, it is not necessary for the DL-MAP within the first preamble set transmitted by a BS to include data for terminals served by relay stations RS. Similarly, it is generally not necessary for the DL-MAP within the second preamble set transmitted by a RS to include data for terminals served directly by a base station BS.

The operation of a relay station will now be described with reference to FIGS. 4 and 5. Between times t0 and t1 a relay station RS transmits the first preamble set 131 of a downlink sub-frame. During the same time interval, a base station transmits a first preamble set 31. The relay station ignores the first preamble set 31 transmitted by the base station. At time t1 the relay station switches to receive, and begins to receive, and buffer, all downlink traffic 36 received from the base station. In this example only part 36 of the frame is used to transmit traffic between the base station BS and relay station RS and so the relay station only needs to receive and buffer traffic from part 36 of the frame. At this point the relay station does not know which of the buffered traffic is intended for itself. At time t3 the relay station begins to receive the second preamble set 41 from the base station. The preamble is used to acquire synchronization. A timing offset is applied to establish the beginning of the frame. The DL-MAP within the second preamble set 41 instructs the relays station which traffic it should relay. The DL-MAP may also specify to which terminal the relay station should retransmit the traffic, or a separate mechanism from the DL-MAP may be used to derive this information, such as a forwarding table derived from a routing algorithm. At time t4 the relay station switches in preparation to transmit. In this example, relay station transmits at time t5 in a burst/slot 150.

Terminals MS within the system will generally receive a downlink frame from the base station BS or from a relay station RS. If a terminal receives a frame directly from a base station BS of the type shown in FIG. 4, it will receive the first preamble set 31, acquire frame synchronization using the preamble within the first preamble set 31, and will use the downlink map DL-MAP to determine when it should receive traffic within the downlink sub-frame. If a terminal receives a frame directly from a relay station RS of the type shown in FIG. 5, it will receive the first preamble set 131, acquire frame synchronization using the preamble within the first preamble set 131, and will use the downlink map DL-MAP to determine when it should receive traffic within the downlink sub-frame. As the downlink sub-frame has a first preamble set at the beginning of the frame, with the same format as the first preamble set transmitted by a base station, the terminal is unaffected by the use of a relay station and the terminal does not need to be modified to receive transmissions via a relay station.

A terminal MS may receive a downlink frame from a base station BS and one or more relay stations RS but, in most circumstances, one transmission will be received more strongly than another. The orthogonal division of the frame prevents interference between traffic transmissions of the base station BS and relay stations RS.

Figure 6:
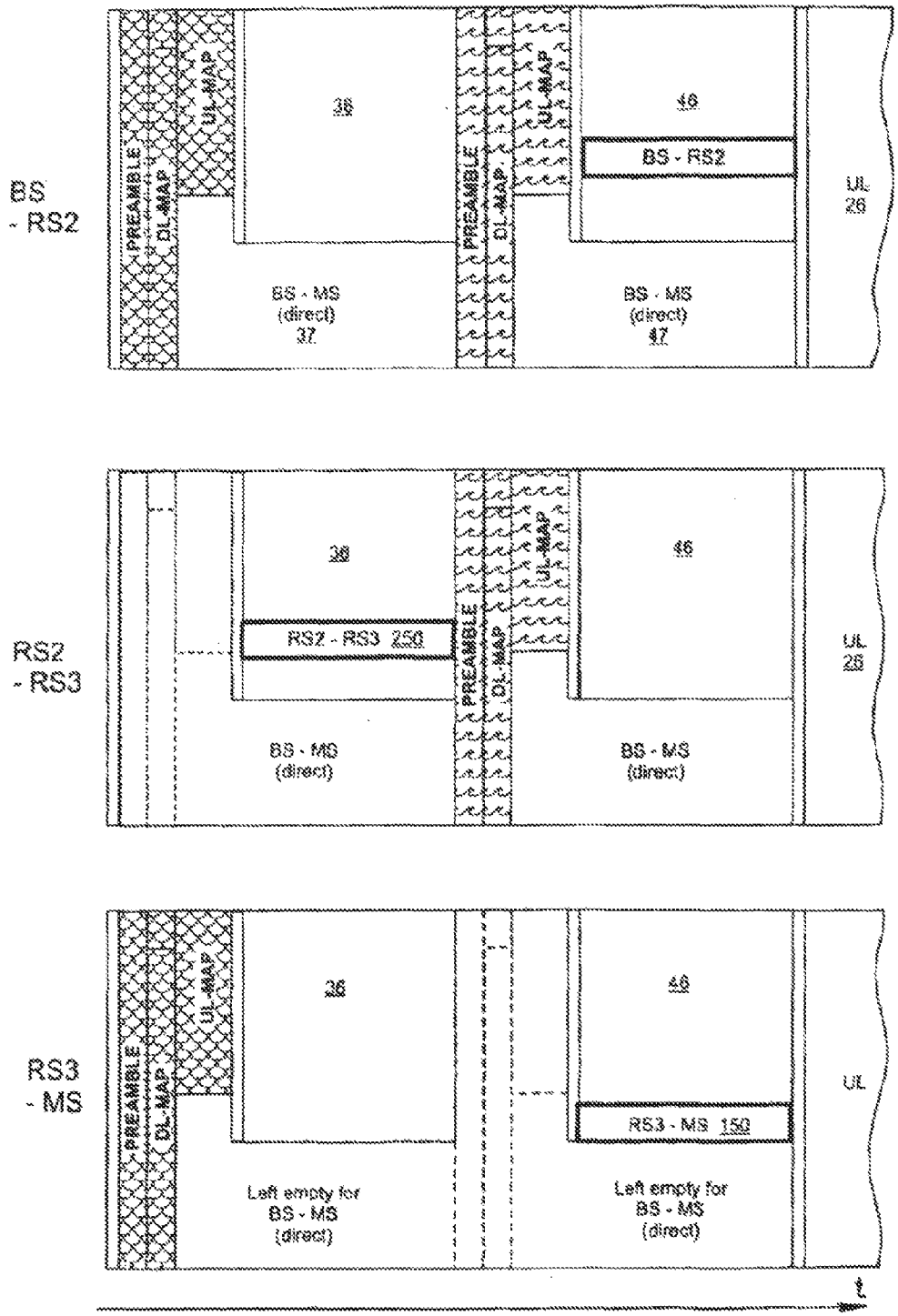
FIG. 6 compares the format of downlink sub-frames used in a three-hop path between a base station and a terminal according to an embodiment of the present invention.

The operation described above assumes a two-hop transmission path between a base station BS and a terminal MS via a single relay station RS. It is possible to apply the invention to paths of three or more hops. Firstly, a three-hop path will be considered where two intermediate relay stations (RS2, RS3 in FIG. 1) are used. For a three hop path a further preamble set could be inserted into the downlink sub-frame for use by the further relay station but this will reduce the amount of resources available for carrying traffic. More preferably, the first and second preamble sets are used in a manner which is shown in FIG. 6. The final relay station RS3 in the multi-hop path must transmit a first preamble set at the beginning of the frame, in the place where a terminal MS is expecting to find the preamble set. This governs what happens in the rest of the multi-hop path. As relay station RS3 must transmit a first preamble set at the beginning of the downlink sub-frame, the previous relay station RS2 along the path must transmit a second preamble set in the middle of the downlink sub-frame. As relay station RS2 is transmitting a second preamble set it must receive a first preamble set from the base station BS at the beginning of the downlink sub-frame. It can be seen that this arrangement avoids the need for any relay station to simultaneously transmit and receive while making efficient use of the space within the downlink sub-frame reserved for preamble sets. In this example it can be seen that the first preamble set transmitted by the base station BS is received by terminals MS directly served by the base station BS and relay station RS2. The second preamble set may be received by other relay stations, such as RS1 in FIG. 1. In FIG. 6 it can be seen that traffic on each of the hops alternates between the first traffic-carrying part 36 and the second traffic-carrying part 46 of the downlink sub-frame. This avoids the need for each of the relay stations to simultaneously transmit and receive traffic.

Figure 7:
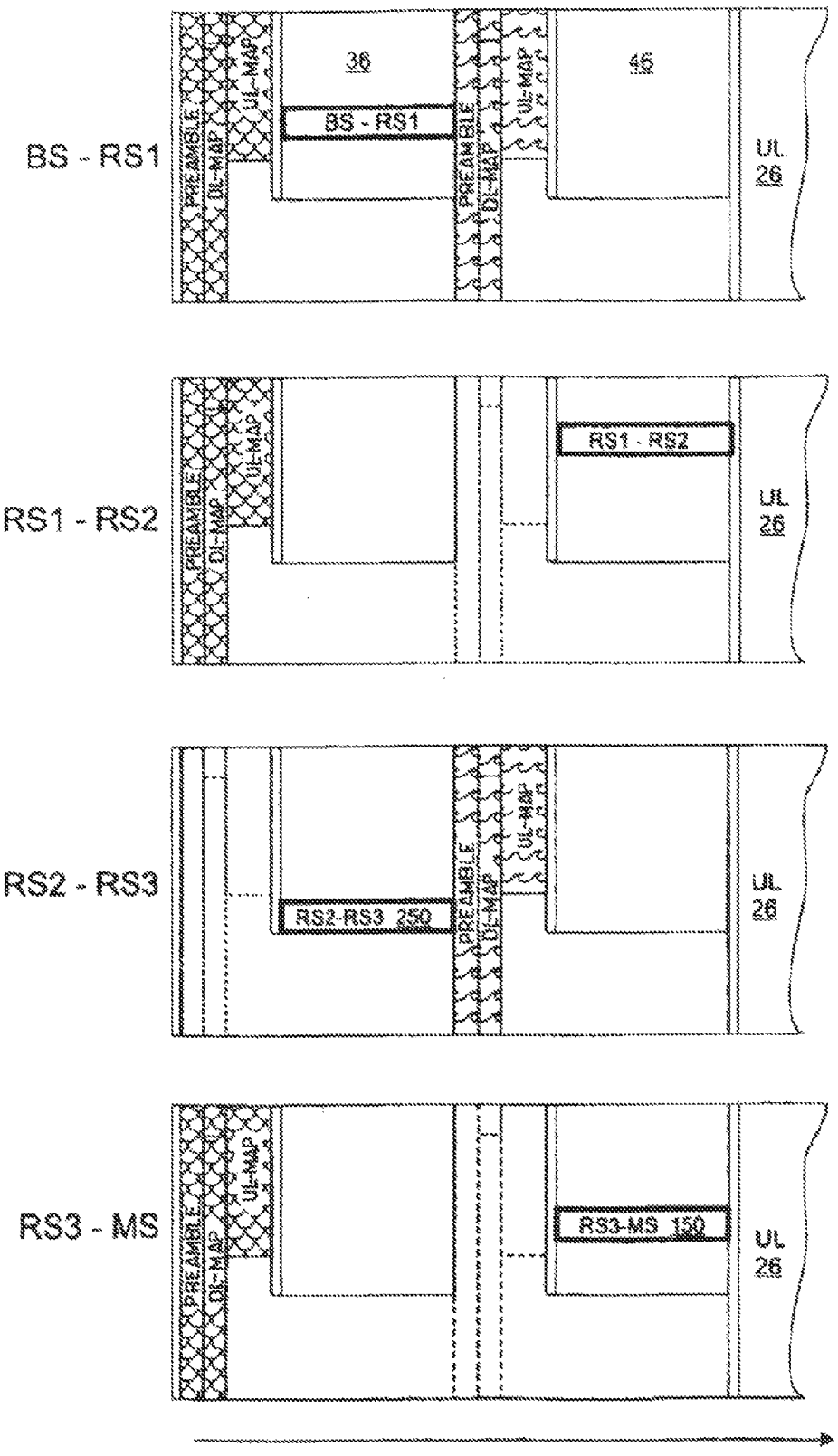
FIG. 7 compares the format of downlink sub-frames used in a four-hop path between a base station and a terminal according to an embodiment of the present invention.

The scheme can be applied to transmission paths of greater than three hops. FIG. 7 shows a four-hop path between a base station BS and a terminal MS. For clarity, the three relay stations between the base station BS and terminal MS are labeled RS1-RS3. These labels do not correspond to those used for the relay stations shown in FIG. 1. Working backwards, relay station RS3 transmits a first preamble set towards a terminal MS and receives a second preamble set from relay station RS2. Relay station RS2 transmits a second preamble set towards relay station RS3 and receives a first preamble set from relay station RS1. Relay station RS1 transmits a first preamble set towards relay station RS2 and receives a second preamble set from the base station BS. The base station BS transmits both the first and second preamble sets. Traffic on each of the hops alternates between the first traffic-carrying part 36 and the second traffic-carrying part 46 of the downlink sub-frame. With the frame format shown in FIGS. 4-7, a relay station needs to transmit traffic in traffic-carrying part 36 of the downlink sub-frame if it is transmitting a second preamble set and a relay station needs to transmit traffic in traffic-carrying part 46 of the downlink sub-frame if it is transmitting a first preamble set. This is because the downlink sub-frame does not include a gap between the end of traffic-carrying part 36 and the start of the second preamble set. However, one skilled in the art will appreciate that varying the specific structure of the downlink sub-frame will allow other combinations, while following the general principle of alternately using the first and second traffic-carrying parts 36, 46 of the downlink sub-frame on adjacent hops.

Each transmitting relay station RS should know how many hops are between itself and the terminal MS. The relay station RS immediately preceding the terminal MS should transmit the preamble set at the beginning of the frame. The penultimate relay station RS should transit the preamble set in the middle of the frame. The position of the preamble set transmitted by relay stations earlier in the path will alternate, and will either be at the beginning of the frame if the next RS in the path towards the MS is transmitting in the middle of the frame, or in the middle of the frame if the next RS in the path towards the MS is transmitting at the beginning of the frame. In general, for a multi-hop path having an even number of hops (2, 4, 6 . . . ) the first hop from the base station BS will require the first relay station RS to receive the second preamble set 41. For a multi-hop path having an odd number of hops (3, 5, . . . ) the first hop from the base station BS will require the first relay station RS to receive the first preamble set 31. Knowledge of the number of hops between a base station and a terminal, and knowledge of the position of a particular relay station within the overall multi-hop path, can be acquired by each relay station (a distributed routing scheme) or by the base station and subsequently disseminated to relay stations (a centralized routing scheme).

Figure 8:
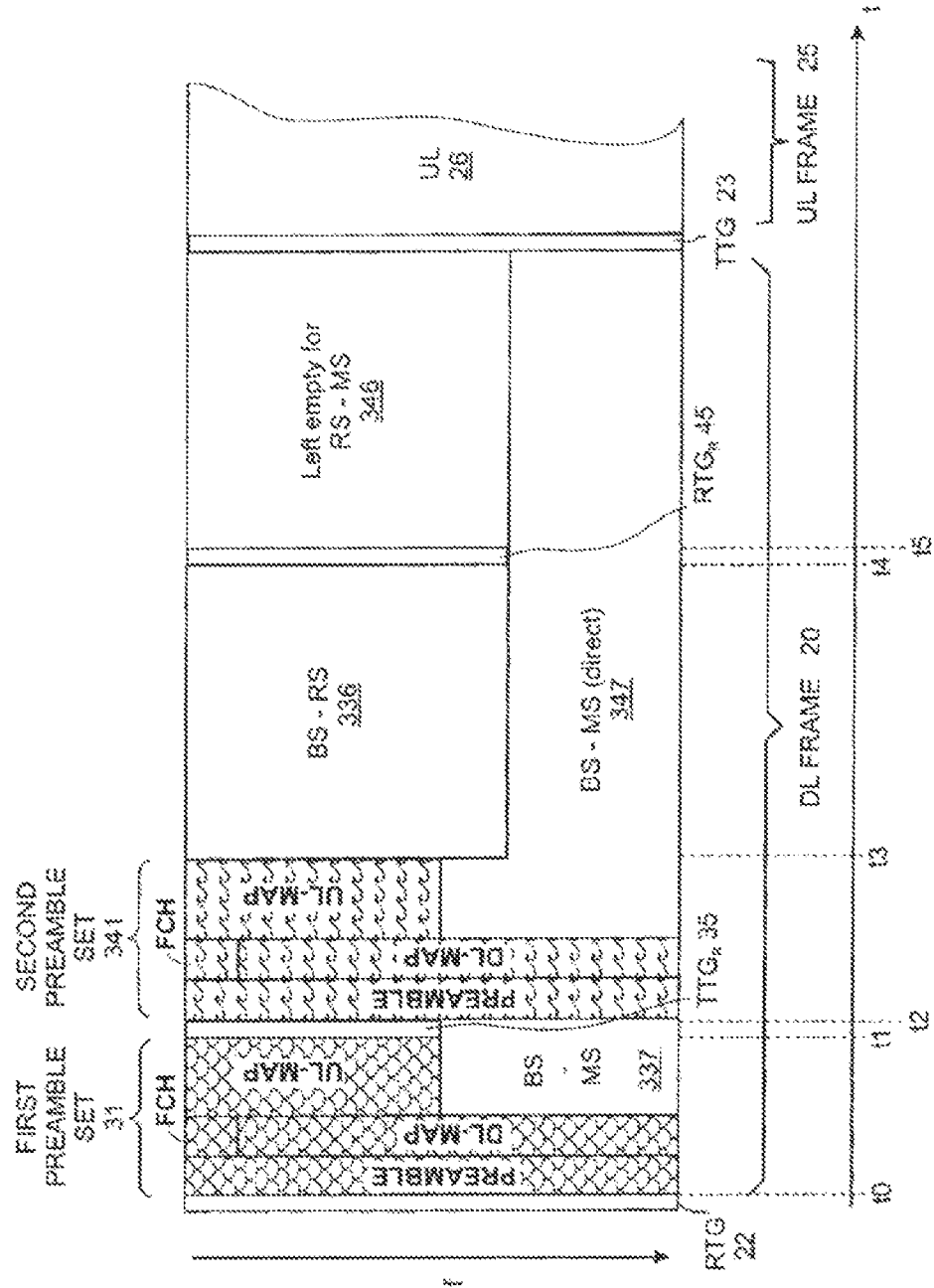
FIG. 8 shows the format of downlink sub-frame transmitted by a base station according to a second embodiment of the present invention.

FIGS. 4-7 show the downlink sub-frame 20 divided into roughly two equal parts 30, 40 with the second preamble set positioned mid-way within the downlink sub-frame 20. However, this is only shown as one example of a possible format for the downlink sub-frame. The division of the downlink sub-frame does not need to be equal. Also, the division can be varied on a frame-by-frame basis, if necessary, according to the ratio between the different traffic categories (BS-RS traffic, RS-MS traffic, RS-RS traffic, BS-MS traffic). The frame format for a particular frame can be signaled in the preamble set. As an alternative to what is shown in FIGS. 4-7, the second preamble set 41 can be positioned anywhere within the downlink sub-frame 20, other than the position occupied by the first preamble set 31. FIG. 8 shows another example of a format for a downlink sub-frame in which the second preamble set 341 immediately follows the first preamble set 31. As it is preferred that the second preamble set should begin with a preamble across all frequency sub-carriers, the space 337 between the end of the first preamble set 31 and the beginning of the second preamble set 341 is used to carry traffic, such as BS-MS traffic. If the second preamble set 341 is positioned within the downlink sub-frame 20 such that there is BS-RS traffic between the first and second preamble sets (as in FIGS. 4-7), the RS will be required to buffer the received frame up to the point at which the second preamble set is received. A relay station RS requires information in the second preamble set (especially the DL-MAP) to determine what data that RS should extract and relay. Therefore, all traffic received during the BS-RS section 336 of the downlink sub-frame should be buffered by the RS. Once the DL-MAP within the second preamble set has been received, the RS can determine what data within the buffer it needs to relay. If the second preamble set 341 immediately follows the first preamble set 31, as shown in FIG. 8, buffering is not be required for this purpose (although it may be required for other reasons). In IEEE 802.16 the first preamble set 31 must always be at the beginning of the frame because this is where the MS expects to find it.

Terminals within the wireless system look for the first preamble set within a received signal and use the preamble to acquire frame synchronization. In the case of IEEE 802.16, the preamble comprises a pseudo noise (PN) code sequence which is carried by a group of OFDM sub-carriers, with each sub-carrier being modulated to a particular constellation value. One of the consequences of adding a second preamble set to the downlink sub-frame is that a terminal could become confused by the presence of two preamble sets, and lock to the wrong preamble. Four possible ways of avoiding this problem will now be described.

Firstly, the preamble within the second preamble set can carry a different pseudo noise (PN) code sequence compared to the preamble within the first preamble set. Synchronization acquiring circuitry in a terminal includes a correlator which attempts to correlate a locally-stored code sequence with the code sequence in a received signal. If the second preamble uses a different code to the one locally-stored at a terminal, the terminal cannot incorrectly sync to the second preamble.

Secondly, the preamble within the second preamble set can use a PN code sequence which is offset compared to the PN code sequence used for the preamble in the first preamble set. In this manner, a terminal will ignore the second preamble. In the WiMAX system the PN code is applied in the frequency domain, so sub-carrier 0 is XORed with symbol 0 of the code, sub-carrier 1 with symbol 1 and so on. The resulting coded sub-carriers are then passed through a frequency domain-to-time domain transform, such as an Inverse Fast Fourier Transform (IFFT). An offset can be applied to the code by simply XORing sub-carrier 0 with code symbol 10, sub-carrier 1 with symbol 11, and so on. This is just an example. Other values of offset can be used. The offset code has good cross-correlation properties with the original code, i.e. a low result is obtained if a receiver cross-correlates the offset code with the original code. This may be advantageous if the number of available codes is limited and there are insufficient to provide a different code to each base station and each relay. This situation may for example occur in a dense urban deployment.

Figure 9:
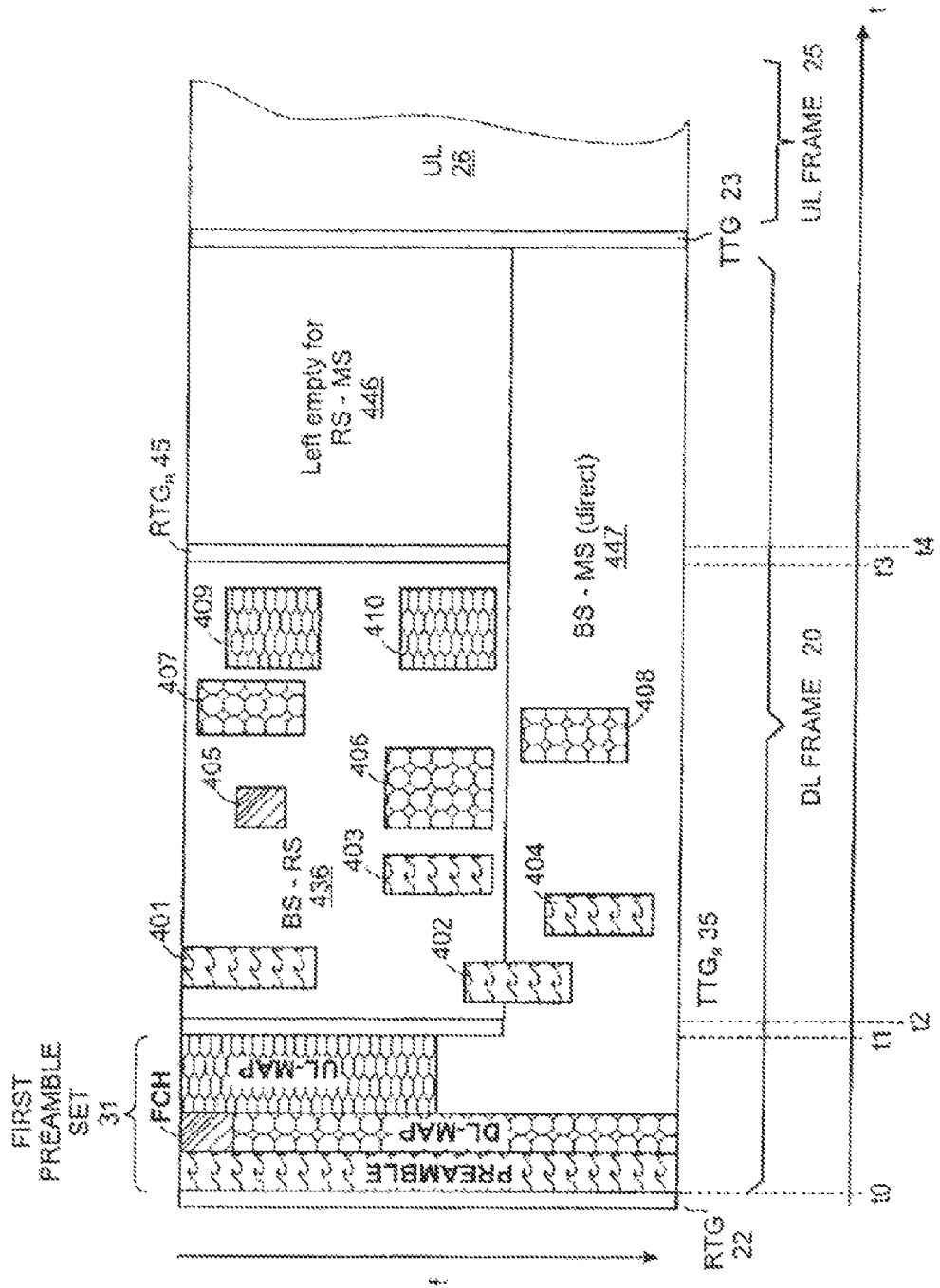
FIG. 9 shows the format of a downlink sub-frame transmitted by a base station according to a third embodiment of the present invention in which a second preamble set is segmented.

Thirdly, the second preamble set can be divided into a plurality of segments which are distributed within the downlink sub-frame. FIG. 9 shows an example of a downlink sub-frame in which the second preamble set is distributed in this way. The preamble is divided into four segments 401-404. The downlink map DL-MAP is divided into three segments 406-408 and the uplink map UL-MAP is divided into two segments 409, 410. A relay station is provided with the knowledge of where the segments are positioned within the frame. It will be understood that the scheme shown in FIG. 8 is only one example of how the segmentation can be achieved. Each part of the second preamble set (preamble, FCH, DL-MAP, UL-MAP) can be divided into a different number of segments, and the position of those segments within the frame can be different to what is shown. The segmentation of the second preamble set can be fixed, i.e. the second preamble set is always divided into the same number of segments which assume the same relative/absolute positions within the downlink sub-frame. In this case the knowledge of where to look for the segments of the second preamble set can be programmed (hard-wired) into each relay station. Alternatively, the segmentation of the second preamble set can be varied, either on a time-basis or on an area basis with, for example, different base stations using different segmentation scheme. In this case, knowledge of the segmentation of the second preamble set can be signaled to a relay station. Terminals do not have this knowledge of the second preamble set and will simply ignore the segments. Preferably, the preamble of the distributed second preamble set is also coded differently to the preamble of the first preamble set, as described above. The preamble within a preamble set denotes the beginning of a frame to a terminal and is therefore the part of the preamble set which it is especially important to hide from terminals.

Fourthly, the sync sequence in the second preamble can be combined with a random sequence which is designed to spoil the correlation properties, such as a scrambling sequence. This can occur in the frequency domain or in the time domain. As an example, the preamble is first multiplied (typically XORed) in the time domain by the scrambling code. In this manner, none of the terminals will confuse the scrambled sequence with a true sync sequence. A relay station RS, when searching for the hidden symbol would first multiply (XOR) by the random sequence, to unscramble the samples, and then perform a correlation for the real sequence. The sync finding correlators in the relay station RS are augmented with this descrambling multiplier.

In the schemes described so far, it has been assumed that a base station directly serves a mix of terminals and relay stations and therefore transmits a downlink sub-frame which contains a first preamble set and a second preamble set. This is the normal case. There are situations in which only one of preamble sets needs to be transmitted. Considering what stations within the network use each of the preamble sets, it can be seen that:

(i) the first preamble set is required where the base station directly serves terminals and where terminals in the network are served via relay stations which form part of a multi-hop path having an odd number of hops.

(ii) the second preamble set is required where terminals in the network are served via relay stations which form part of a multi-hop path having an even number of hops.

If the base station does not need to transmit the second preamble set, the base station can either reallocate the space within the downlink sub-frame which would have been occupied by the second preamble set to other downlink traffic, or it can simply not transmit within that part of the downlink sub-frame. If a base station does not need to transmit the first preamble set the base station can either reallocate the space within the downlink sub-frame which would have been occupied by the first preamble set to other downlink traffic, or it can simply not transmit within that part of the downlink sub-frame. The option of not transmitting can have an advantage in reducing interference within the network, as terminals will now receive the first preamble set transmitted by relay stations without any interfering first preamble transmissions from the base station. If the base station does not directly serve any terminals, traffic carrying parts 37, 47 of the downlink sub-frame can be reallocated to carrying relay station-terminal (RS-MS) or relay station-relay station (RS-RS) traffic. If there are no relay stations at all, the parts 36, 46 of the downlink sub-frame can be reallocated to carrying base station-terminal traffic.

A base station can determine what type of stations (relay stations, terminals) it is serving, and the number of hops within each path, from information acquired when establishing a connection with each station and can vary the content of a downlink sub-frame based on this information.

Figure 10:
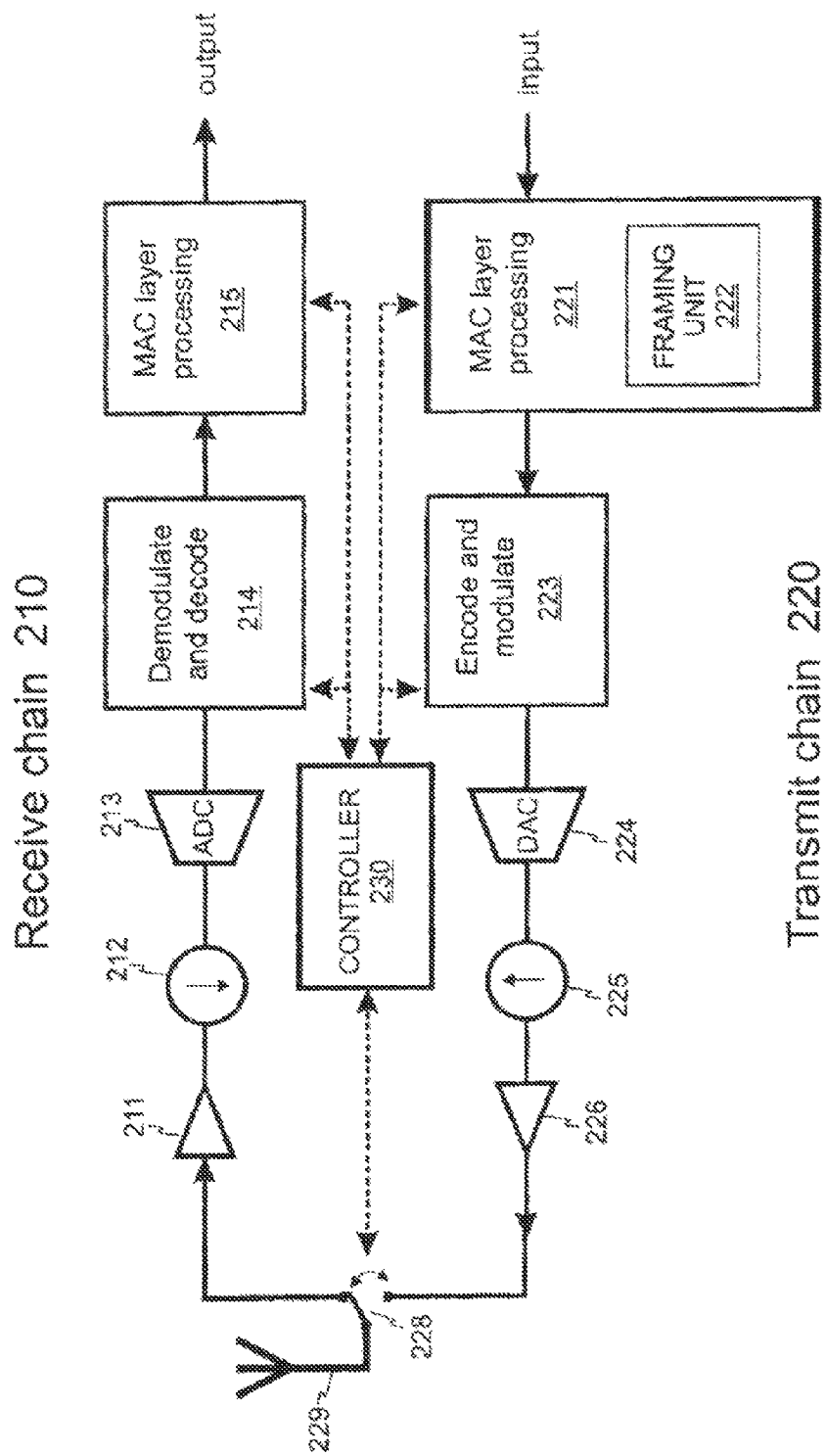
FIG. 10 shows transceiver apparatus at a base station.

FIG. 10 shows a time-division duplex transceiver apparatus for a base station BS which implements the invention. The transceiver comprises an antenna 229 which connects to a Tx/Rx switch 228. The switch 228 alternately connects the transmit chain 220 to the antenna 30, to convey a high-power signal for transmission, or connects the antenna 229 to the receive chain 210 to convey a relatively low power received signal. A circulator can be used in place of the Tx/Rx switch 228. The receive chain 210 comprises an amplifier 211, a down-converter 212 which converts the received RF signal to an Intermediate Frequency (IF) or directly to base band, and an analog-to-digital conversion stage 213 which operates on the down-converted signal. The digitized signal is applied to a demodulation & decoding stage 214 where the digitized signal is demodulated, data is extracted from the uplink frame, and extracted data is decoded. Stage 214 feeds a MAC layer processing stage 215.

The transmit chain 220 receives data for transmission. A MAC layer processing stage 221 performs functions such as scheduling data for transmission according to the intended destination and based on a requested quality of service. Stage 221 includes a framing unit 222 which assembles data into a frame having the structure previously described. Data for transmission is forwarded to an encoding and modulation stage 223 which prepares the data for transmission at the physical layer. Data is encoded to, for example, add error correction coding. The framing unit 223 generates the first and second preamble sets and inserts these into the frame at the appropriate positions. As described previously, the format of the frame can vary on a frame-by-frame basis according to factors such as the ratio of downlink-to-uplink traffic. The data carried within each preamble set allows terminals and relay stations to correctly acquire synchronization with the frame, and to process the frame. Each frame of data is modulated using an OFDM modulation scheme, the details of which are well-known. In summary, in an OFDM modulation scheme data is carried by a parallel set of sub-carriers, spaced apart in frequency. Data to be transmitted is mapped to constellation values on each of the sub-carriers and the resulting set of modulated sub-carriers are converted to the time-domain, such as by an Inverse Fast Fourier Transform (IFFT) operation. The encoded and modulated frame is forwarded to a digital-to-analog converter 224 and then an up-converter 225 which translates the modulated signal to RF. The up-converted signal is applied to a power amplifier 226 and on to the Tx/Rx switch 228 and antenna 229 for transmission. A controller 230 controls operation of the transceiver. Controller 230 collects information about the topology of the network (e.g. what connections exist, the number of hops in each connection) and instructs framing unit 223 to include the first and/or second preamble sets within a downlink sub-frame based on this information. This information can also be forwarded to relay stations within the network to allow them to establish their position within a multi-hop path.

Figure 11:
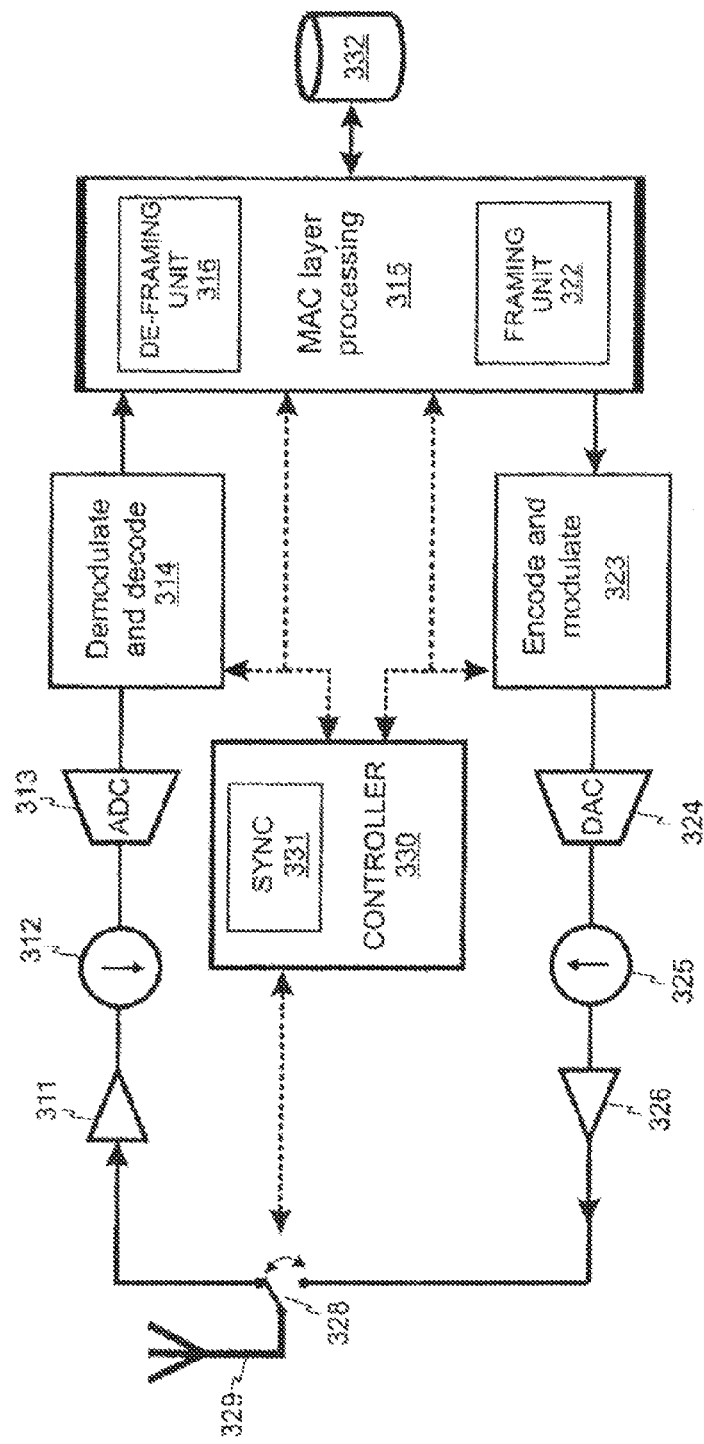
FIG. 11 shows transceiver apparatus at a relay station.

FIG. 11 shows a time-division duplex transceiver apparatus for use at a relay station RS to implement the invention. The transceiver has a receive chain 310 and transmit chain 320 which comprise the same stages as the receive and transmit chains of the base station which have just been described. A MAC processing stage 315 includes a de-framing unit 316 which receives a frame from the base station and extracts either the second preamble set or first preamble set from the signal, depending on the position of the relay station within a multi-hop path. Using data within the DL-MAP and UL-MAP fields of the preamble set, stage 315 extracts traffic which the relay station is required to relay. Depending on the position of the second preamble set within the frame, received data may be stored in buffer 332 until stage 315 is able to determine what traffic needs to be relayed. The data which needs to be relayed is assembled by a framing unit 322 within the MAC processing stage 315. Depending on the position of the relay within a multi-hop path, the framing unit 322 generates a first or a second preamble set for inclusion within the frame. If the relay station is serving a terminal, the first preamble set is generated. If the relay station is serving a further relay station, the first or second preamble set is generated. Framing unit 322 generates data for the DL-MAP which will allow a terminal or downstream relay station to find the relayed data within the downlink sub-frame. A controller 330 controls operation of the transceiver. The receive chain extracts timing information from the preamble within the first preamble set received from the base station BS and feeds this to synchronization unit 331. Synchronization unit 331 can use any well-known methods to acquire synchronization in terms of time and frequency offset. Synchronization unit 331 can, for example, use an autocorrelation technique to acquire information about a frequency offset in the received signal and can acquire synchronization in terms of time by a cross-correlation technique which correlates a code sequence carried within the preamble of a preamble set with a locally-stored code sequence. Timing information derived by the synchronization unit 331 is used by the transmit and receive chains and is used to control the Tx/Rx switch 328. Switch 328 will be operated during the guard periods 22, 23 between uplink and downlink sub-frames and during the additional guard periods 35, 45.

Controller 330 can receive information from a base station, or can determine information for itself, about the position of the relay station within a multi-hop path. Based on this information, the relay station can determine whether it needs to receive a second preamble set and transmit a first preamble set, or to receive a first preamble set and transmit a second preamble set.

The relay station (i) receives to and transmits from the base station and (ii) transmits to and receives from a terminal or a downstream relay station. The transceiver can use a single antenna, or antenna array, for (i) and (ii) or it can use different antennas for (i) and (ii) with, for example, a directional antenna facing the base station BS and an antenna having a wider radiation pattern facing a region in which terminals are located.

The antennas shown in FIGS. 10 and 11 can take the form of an antenna array which provides diversity transmission and/or diversity reception. The antenna can have an omni-directional radiation pattern or, more preferably, has a directional radiation pattern. The antenna can be a smart antenna which can adapt the radiation pattern according to the position of relays or terminals which the base station is serving.

The invention is not limited to the embodiments described herein, which may be modified or varied without departing from the scope of the invention.

What is claimed is:

1. A method of operating a relay station within a wireless network comprising a base station, a plurality of relay stations and a terminal, the method comprising:
   transmitting a downlink sub-frame from the relay station as part of a multi-hop path between the base station and the terminal; and,
   selectively including within the downlink sub-frame one of:
      a first preamble selected only when an odd number of hops remain in the path between the relay station and the terminal; or
      a second preamble selected only when an even number of hops remain in the path between the relay station and the terminal;
   wherein the first and second preambles occupy different positions within the downlink sub-frame.

2. The method according to claim 1, wherein the downlink sub-frame further comprises a first traffic-carrying section and a second traffic-carrying section and wherein the method further comprises selectively inserting traffic for transmission in the first traffic-carrying section or the second traffic-carrying section of the downlink sub-frame according to the position of the relay station within the multi-hop path.

3. The method according to claim 1, wherein the downlink sub-frame further comprises a first traffic-carrying section and a second traffic-carrying section and wherein the method further comprises receiving a downlink sub-frame at the relay station which includes traffic for that relay station in one of the first and second traffic-carrying sections and selectively inserting traffic for retransmission in the other of the first and section traffic-carrying sections from which the traffic was received.

4. The method according to claim 1, wherein the downlink sub-frame is transmitted from the relay station at a time that is synchronized with the base station on a frequency bearer, the method further comprising:
   receiving a downlink sub-frame from a base station on the same, or a substantially similar, frequency bearer.

5. The method according to claim 1, wherein the second preamble is divided into a plurality of segments which are distributed within the downlink sub-frame.

6. The method according to claim 1, wherein the first preamble is positioned at the start of the downlink sub-frame and the second preamble is positioned after the first preamble.

7. The method according to claim 1, further comprising:
   selectively inserting traffic into one of:
      a first traffic-carrying section of the downlink sub-frame selected only when an odd number of hops remain in the path between the relay station and the terminal; or
      a second traffic-carrying section of the downlink sub-frame selected only when an even number of hops remain in the path between the relay station and the terminal;
   wherein the first and second traffic-carrying sections occupy different positions within the downlink sub-frame.

8. The method according to claim 1, wherein each preamble comprises data specifying a correspondence between a terminal or relay station and a location of data for that terminal or relay station within the frame.

9. The method according to claim 1, wherein the downlink sub-frame forms part of a transmission frame, the transmission frame also having an uplink sub-frame which occupies a different frequency bearer to the downlink sub-frame.

10. A transceiver apparatus for a relay station of a wireless network comprising a base station, a plurality of relay stations and a terminal, the transceiver comprising:
a transmit stage configured to:
transmit a downlink sub-frame from the relay station as part of a multi-hop path between the base station and the terminal; and
selectively include within the downlink sub-frame one of:
a first preamble selected only when an odd number of hops remain in the path between the relay station and the terminal; or
a second preamble selected only when an even number of hops remain in the path between the relay station and the terminal;
wherein the first and second preambles occupy different positions within the downlink sub-frame.

11. The transceiver apparatus according to claim 10, wherein the downlink sub-frame extends across a plurality of sub-carriers, wherein the transmit stage is further configured to:
provide a first guard period extending over a portion of the plurality of sub-carriers, the first guard period positioned between the different positions of the first preamble and the second preamble for allowing a relay station to switch between a transmit operation and a receive operation.

12. The transceiver apparatus according to claim 10, wherein the downlink sub-frame further comprises a first traffic-carrying section and a second traffic-carrying section, wherein the transmit stage is further configured to:
selectively insert traffic for transmission in the first traffic-carrying section or the second traffic-carrying section of the downlink sub-frame according to the position of the relay station within the multi-hop path.

13. The transceiver apparatus according to claim 10, wherein the downlink sub-frame further comprises a first traffic-carrying section and a second traffic-carrying section, wherein the transmit stage is further configured to:
receive a downlink sub-frame at the relay station which includes traffic for that relay station in one of the first and second traffic-carrying sections and selectively inserting traffic for retransmission in the other of the first and section traffic-carrying sections from which the traffic was received.

14. The transceiver apparatus according to claim 10, wherein the downlink sub-frame is transmitted from the relay station at a time that is synchronized with the base station on a frequency bearer, wherein the transmit stage is further configured to:
receive a downlink sub-frame from a base station on the same, or a substantially similar, frequency bearer.

15. The transceiver apparatus according to claim 10, wherein the second preamble is divided into a plurality of segments which are distributed within the downlink sub-frame.

16. The transceiver apparatus according to claim 10, wherein the first preamble is positioned at the start of the downlink sub-frame and the second preamble is positioned after the first preamble.

17. The transceiver apparatus according to claim 10, wherein the transmit stage is further configured to:
selectively insert traffic into one of:
a first traffic-carrying section of the downlink sub-frame selected only when an odd number of hops remain in the path between the relay station and the terminal; or
a second traffic-carrying section of the downlink sub-frame selected only when an even number of hops remain in the path between the relay station and the terminal;
wherein the first and second traffic-carrying sections occupy different positions within the downlink sub-frame.

18. The transceiver apparatus according to claim 10, wherein each preamble comprises data specifying a correspondence between a terminal or relay station and a location of data for that terminal or relay station within the frame.

19. The transceiver apparatus according to claim 10, wherein the downlink sub-frame forms part of a transmission frame, the transmission frame also having an uplink sub-frame which occupies a different frequency bearer to the downlink sub-frame.

20. A non-transitory computer-readable medium comprising software instructions executable by a processor of a relay station of a wireless network comprising a base station, a plurality of relay stations and a terminal, to cause the relay station to:
transmit a downlink sub-frame from the relay station as part of a multi-hop path between the base station and the terminal; and
selectively include within the downlink sub-frame one of:
a first preamble selected only when an odd number of hops remain in the path between the relay station and the terminal; or
a second preamble selected only when an even number of hops remain in the path between the relay station and the terminal;
wherein the first and second preambles occupy different positions within the downlink sub-frame.

* * * * *